Figures 1, 2:
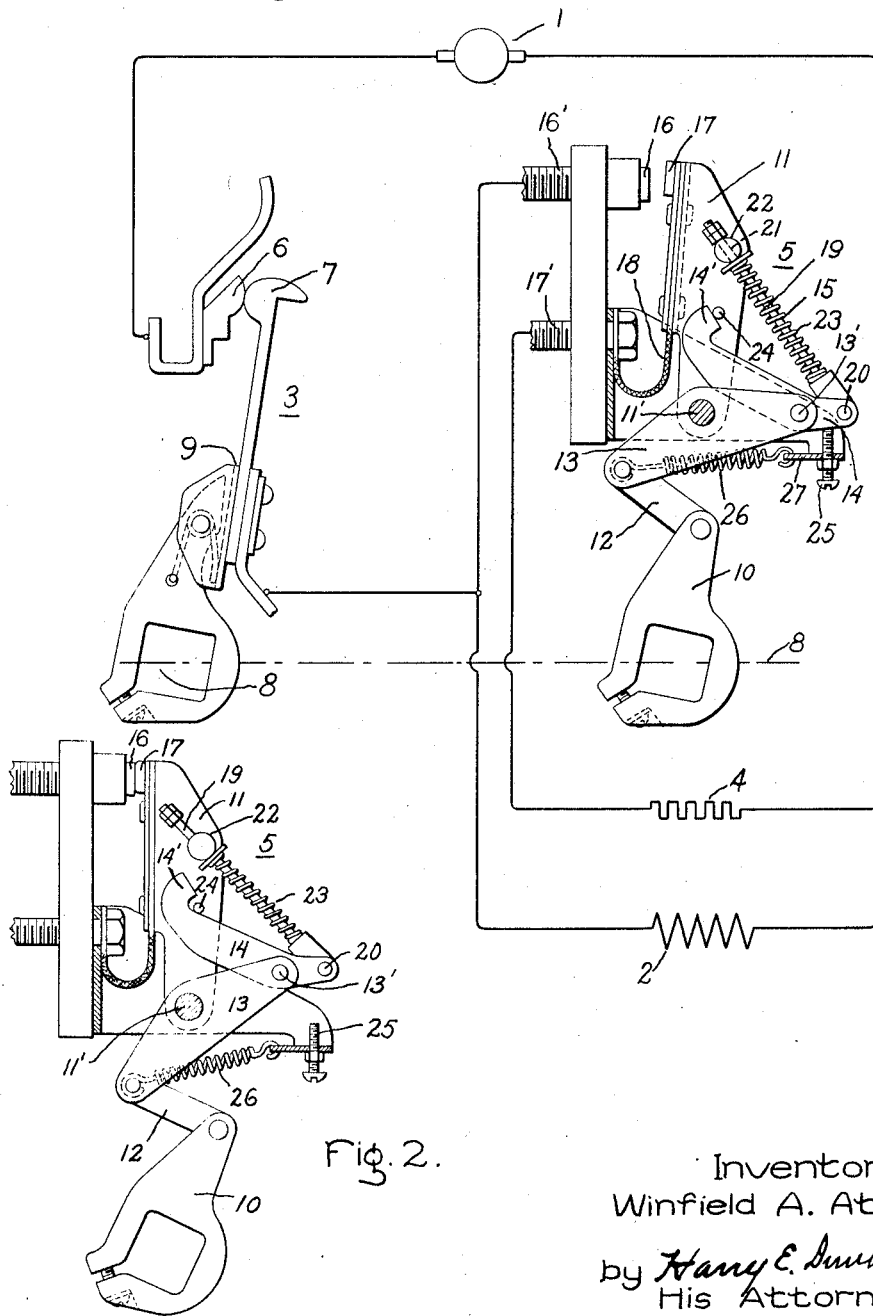

June 11, 1940.  W. A. ATWOOD  2,204,393

AUXILIARY SWITCH

Filed March 2, 1939

Inventor:
Winfield A. Atwood.
by Harry E. Dunham
His Attorney.

Patented June 11, 1940

2,204,393

UNITED STATES PATENT OFFICE 2,204,393

AUXILIARY SWITCH

Winfield A. Atwood, Yeadon, Pa., assignor to General Electric Company, a corporation of New York Application March 2, 1939, Serial No. 259,365

10 Claims. (Cl. 200—50)

My invention relates to auxiliary switches such as field discharge switches, more particularly to field discharge switches having specific application to conventional moderate capacity air circuit breakers for example, and has for its principal object the provision of an improved auxiliary field discharge switch that can be attached as a separate and operative unit to a conventional air circuit breaker.

Whenever it is necessary to open the D. C. field of an electric generator or motor, the resulting induced voltage if considerable may, if no special provision be made, damage the insulation of the field windings of such machine or other electrically connected apparatus. Sometimes the equipment is protected by means of a discharge clip that is arranged to make contact with one of the field switch blades before the field circuit is broken at the main switch contacts, thereby to connect a discharge resistor in series with the field winding immediately before the field circuit proper is interrupted. Voltage induced under these circumstances causes flow of current through the discharge resistor so that the energy is dissipated in the form of heat.

In such applications, however, the main switch is generally of the simple knife blade type which is unsuitable for interrupting a high voltage or high amperage power circuit. Where conventional air circuit breakers of high interrupting capacity are used, the above described contact clip arrangement, although comparatively simple is neither practical nor adequate.

In accordance with my invention a special field discharge switch is interlocked through a common operating member, such as the main shaft, to the circuit breaker serving as the main field switch so that it can be applied as a special attachment and operated in positive and predetermined relation to the breaker without necessitating disassembly of the main breaker structure.

My invention will be more fully set forth in the following description referring to the accompanying drawing, and the features of novelty which characterize my invention will be pointed out with particularity in the claims annexed to and forming a part of this specification.

Referring to the drawing, Fig. 1 is a partly diagrammatic view of a field discharge system embodying the present invention and Fig. 2 is a partial view of Fig. 1 showing the auxiliary switch in another position.

The system illustrated by Fig. 1 includes an exciter indicated at 1, a field winding 2 for a separate machine (not shown) and a circuit breaker 3 arranged to function as a field switch. The breaker 3 in practice may be of the multi-pole type but is here illustrated as single pole in the interest of clearness. A field discharge resistance 4 is arranged to be connected in shunt with the field winding 2 by an auxiliary or field discharge switch generally indicated at 5. The general requirements for operation of the field discharge switch are that when the main field breaker is closed, the field discharge switch should be open and vice versa. The most desirable operation of the field discharge switch from the standpoint of maximum protection requires that there be a certain degree of "overlap" so that the field discharge switch closes its circuit prior to opening of the main field breaker and that there also be a certain degree of over lap in the reverse operation. That is, the field discharge switch should open its circuit prior to actual closing of the main field breaker. As above indicated, the first requirement is to insure that a highly inductive circuit is not opened by the field breaker proper as this might involve difficulty in extinguishing the arc and also possible damage to the insulation of the associated electrical apparatus. The second requirement is to insure that the field discharge switch has no occasion to open a circuit through the discharge resistance in parallel with the field winding.

Referring more particularly to the arrangement for insuring the above described operation, the main field breaker 3 can comprise suitable arc interrupting contacts 6 and 7, the movable contact 7 being shown as mounted for rotative movement on a main operating shaft diagrammatically indicated at 8. The contact 7 is also resiliently mounted at 9 so as to provide for a certain degree of over-travel or "wipe" after initial engagement of the contacts. Thus, when the breaker is closed the springs at 9 will be compressed as the shaft 8 is rotated slightly more so that upon reverse or opening movement there will be an initial rotation of the shaft 8 prior to actual separation of the contacts 6 and 7. The field discharge switch 5 is also operatively connected to the main shaft 8, or the equivalent thereof so that the field discharge switch is closed during the above described initial movement of the shaft prior to opening of the main field breaker.

To this end a crank 10 is secured to the shaft 8 and is connected to the pivoted switch arm 11 of the auxiliary field discharge switch through means including thrust-transmitting structure such as a link 12, a lever 13 co-pivotally mounted at 11' with the switch arm 11, a latch 14 pivotally carried at 13' by the lever 13, and a resilient connection 15. The switch arm 11 is shown in the open circuit position in Fig. 1 and is closed by counterclockwise movement about the pivot 11' to engage the field discharge contacts 16 and 17. These contacts are in turn suitably connected to the terminals 16' and 17' of the field discharge switch, the movable contact 17 being connected to its associated terminal through a flexible conductor 18.

Assuming now that the field breaker 3 is to be opened, the main operating shaft 8 is rotated by suitable actuating means in the clockwise direction. During the initial movement of the shaft the field breaker contacts 6 and 7 remain closed while the crank 10 of the field discharge switch is being rotated clockwise to cause closing of the discharge contacts 16 and 17 through the linkage above referred to. As the crank 10 is rotated clockwise, the lever 13 is rotated counterclockwise to elevate the resilient connection 15 and close the switch arm 11. The connection 15 specifically comprises a guide rod 19 pivotally connected to the latch 14 at 20 and slidably guided at 21 in a rotatable bearing 22 secured to the switch arm 11. A compression spring 23 is seated between a shoulder on the rod 19 and the bearing 22. Accordingly as the lever 13 is rotated counterclockwise, the arm 11 is closed by the thrust transmitted by the spring 23 and upon continued rotation of the lever 13 as the main field breaker 3 is opened the spring 23 is simply compressed by reason of the guided or lost-motion connection at 21.

During the above described operation the spring 23 serves to bias the hooked latching end 14' of the latch into engagement with a pin 24 carried by the switch arm 11. However, after closing of the discharge contacts 16 and 17, continued counterclockwise rotation of the lever 13 serves to carry the latch 14 beyond the pin 24 whereupon the spring 23 snaps the latch clockwise into latching engagement with the pin.

The main field breaker is now open and the field discharge switch in the closed position shown by Fig. 2. Accordingly when the field breaker is to be closed, the shaft 8 is rotated counterclockwise, and by reason of the latched connection at 14'—24 the discharge contacts 16—17 are immediately opened an appreciable time in advance of engagement of the breaker contacts 6 and 7. As the field breaker continues to close, the lever 13 is rotated clockwise to the position shown in Fig. 1 wherein the latch 14 engages an adjustable stop member 25 so as to unlatch the connection at 24. Immediately upon the unlatching operation the spring 23 serves to return the switch arm 11 a short distance toward the closed and unlatched position as indicated in Fig. 1. The mechanism is now in position for another field opening operation as above described.

A spring 26 connected to the lever 12 and to a fixed portion of the switch frame 27 functions to assist opening of the main field breaker 3 and the closing of the field discharge switch 5. This spring obviously can be associated with the shaft 8 or breaker 3 if desired.

It should be understood that my invention is not limited to specific details of construction and arrangement thereof herein illustrated, and that changes and modifications may occur to one skilled in the art without departing from the spirit of my invention.

What I claim as new and desire to secure by Letters Patent of the United States is:

1. The combination with a circuit breaker having an operating member, of an auxiliary switch operatively connected to said member for predetermined operation with respect to said breaker comprising a pivoted switch contact arm, latching means for directly connecting said arm to said member for effecting opening movement of said auxiliary switch, and a resilient connection between said member and arm for closing said auxiliary switch in response to initial movement of said member prior to actual opening of said breaker, said connection being stressed during continued opening of said breaker for latching said arm with respect to said member, and for increasing the contact pressure at said auxiliary switch.

2. The combination with a circuit breaker having an operating shaft, of an auxiliary switch operatively connected to said shaft for positive and predetermined operation with respect to said breaker comprising a pivoted switch arm, thrust transmitting structure for interconnecting said shaft and switch arm for causing closing movement of said arm when said breaker is being opened and opening movement of said arm as said breaker is being closed, said thrust transmitting structure including a latch having a resilient connection with said switch arm and operatively related to said arm so that said switch arm is moved to closed circuit position in response to initial rotation of said shaft to open said breaker, said resilient connection being stressed during continued opening of said breaker to cause engagement of said latch with said switch arm whereby upon reverse rotation of said shaft said switch arm is immediately moved by said latch toward open circuit position.

3. The combination with a circuit breaker having an operating shaft, of an auxiliary switch connected to said shaft for predetermined operation with respect to said breaker comprising a switch arm, means including a latch for interconnecting said shaft and switch arm, and a resilient connection between said latch and arm whereby said arm is moved to closed circuit position in response to initial rotation of said shaft and said connection is subsequently stressed to bias said latch into latching engagement with said switch arm, and means for unlatching said switch arm when said shaft is rotated in the opposite direction to open said auxiliary switch whereby said resilient connection is effective to return said switch arm to a neutral unlatched position.

4. The combination with a field circuit breaker having an operating shaft and means resiliently interconnecting said breaker and shaft providing limited wipe, of an auxiliary field discharge switch operatively connected to said shaft for predetermined operation with respect to said breaker, comprising a pivoted switch arm and a latch including a spring operatively interconnecting said shaft and switch arm, said spring being stressed upon initial rotation of said shaft prior to actual opening of said breaker for closing said auxiliary switch, said spring also causing latching of said arm with respect to said shaft whereby initial rotation of said shaft in the opposite direction causes immediate opening of said auxiliary switch.

5. The combination with a field circuit breaker having a rotatable operating shaft, of an auxiliary field discharge switch mounted as a separate and detachable unit with respect to said shaft for predetermined operation, comprising a crank secured to said shaft, a pivoted switch arm, a latch and spring connected thereto arranged selectively to actuate said switch arm through said crank, said spring transmitting the closing force to said switch arm upon initial rotation of said shaft, and arranged to be stressed upon continued rotation of said shaft to bias said latch into engagement with said switch arm whereby said latch is effective directly to open said auxiliary switch in response to initial rotation of said shaft in the opposite direction.

6. The combination with a circuit breaker having an operating shaft, of an auxiliary switch operatively connected to said shaft for predetermined operation with respect to said breaker comprising a pivoted switch arm, a lever operatively connected to said shaft, a latch pivotally carried by said lever, said latch being adapted to latch said switch arm with respect to said lever, and a spring operatively interconnecting said latch and switch arm arranged so that predetermined rotation of said lever initially results in closing of said auxiliary switch and stressing of said spring, continued rotation of said lever causing such spring to bias said latch to latching position whereby opposite rotation of said lever serves to open said auxiliary switch directly through said latch.

7. A switch comprising a pivoted contact arm, actuating means therefor including thrust transmitting structure operatively connected to said arm, said structure including a spring and a latch arranged to be biased thereby into latching engagement with said arm only in accordance with predetermined operation of said actuating means in the contact closing direction, said spring also being adapted firmly to bias closed said contact arm, and means connecting said latch with said thrust transmitting structure whereby said contact arm is opened directly through said latch in accordance with opening movement of said structure.

8. A switch comprising a pivoted contact arm, actuating means therefor including a spring arranged to be stressed to close said arm, a latch arranged to be biased by said stressed spring into latching engagement with said arm, said spring also being adapted firmly to bias said contact arm closed, and means connecting said latch with said actuating means whereby said contact arm is opened directly through said latch in accordance with opening movement of said actuating means.

9. The combination with a switch having a main operating member, of a second switch operatively connected to said main member for predetermined operation with respect to said first-named switch comprising a movable switch arm, a latch connected to said main member and arranged to engage said switch arm for effecting opening movement of said second switch, and a resilient connection between said latch and switch arm arranged to be stressed upon predetermined movement of said main operating member for closing said second switch and for moving said latch into latching engagement with said switch arm.

10. The combination with a switch having a main operating member, of a second switch operatively connected to said member for predetermined operation with respect to said first-named switch comprising a pivoted switch arm, a lever arranged to be rotated in accordance with movement of said main operating member, a latch pivotally mounted on said lever and arranged to coact with said pivoted switch arm, and a spring interconnecting said latch and said pivoted switch arm, said spring arranged to transmit switch closing movement from said lever to said switch arm and to be stressed for moving said latch into operative engagement with said pivoted switch arm whereby reverse movement of said lever is effective through said latch to cause switch opening movement of said pivoted switch arm.

WINFIELD A. ATWOOD.